United States Patent
Regnault de la Mothe et al.

(10) Patent No.: US 9,416,615 B2
(45) Date of Patent: Aug. 16, 2016

(54) SYSTEM AND METHOD FOR IMPROVING ZONAL ISOLATION IN A WELL

(75) Inventors: Loic Regnault de la Mothe, Le Chesnay (FR); Sylvaine Le Roy-Delage, Paris (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 690 days.

(21) Appl. No.: 13/640,479

(22) PCT Filed: Apr. 11, 2011

(86) PCT No.: PCT/EP2011/001819
§ 371 (c)(1),
(2), (4) Date: Oct. 29, 2012

(87) PCT Pub. No.: WO2011/131307
PCT Pub. Date: Oct. 27, 2011

(65) Prior Publication Data
US 2013/0037267 A1 Feb. 14, 2013

(30) Foreign Application Priority Data
Apr. 20, 2010 (EP) ..................................... 10290212

(51) Int. Cl.
*E21B 33/12* (2006.01)
*E21B 33/10* (2006.01)
(Continued)

(52) U.S. Cl.
CPC ............... *E21B 33/10* (2013.01); *C08F 220/56* (2013.01); *C09K 8/422* (2013.01); *E21B 33/1208* (2013.01); *C08F 220/38* (2013.01); *C08F 220/60* (2013.01)

(58) Field of Classification Search
CPC ....... E21B 33/12; E21B 33/134; E21B 33/14; E21B 33/1208; C09K 8/46; C04B 2103/0049
USPC .................................. 166/179, 292, 293, 387
See application file for complete search history.

(56) References Cited

U.S. PATENT DOCUMENTS

| 1,898,821 A | 2/1933 | Ewald |
| 3,385,567 A | 5/1968 | Case et al. |

(Continued)

FOREIGN PATENT DOCUMENTS

| EP | 0810239 | 9/2000 |
| EP | 1315883 | 3/2006 |

(Continued)

OTHER PUBLICATIONS

M. Gauthier, T. Carrozzella, A. Penlidis, "Sulfobetaine zwitterionomers based on n-butyl acrylate and 2-ethoxyethyl acrylate: monomer synthesis and copolymerization behavior", Journal of Polymer Science, 40, 2002, pp. 511-523.

(Continued)

*Primary Examiner* — Michael Wills, III
(74) *Attorney, Agent, or Firm* — Jeremy D. Tillman; Mike Flynn; Tim Curington

(57) ABSTRACT

A system for improving zonal isolation incorporates a tubular having an outer surface and a swellable coating that coats the outer surface. The swellable coating has an external surface, a composition provided in an annular space outside the tubular, or both. The swellable coating is made of a first swellable material that can swell when contacted by a first fluid on the external surface. The composition is made of a second swellable material that can swell when contacted with second fluid. The first swellable material, the second swellable material, or both, include an elastomer that is compounded with an aqueous inverse emulsion of particles of a polymer comprising a betaine group. The elastomer is able to swell when contacted by hydrocarbons and saline aqueous fluids.

18 Claims, 4 Drawing Sheets

(51) Int. Cl.
*C08F 220/56* (2006.01)
*C09K 8/42* (2006.01)
*C08F 220/38* (2006.01)
*C08F 220/60* (2006.01)

(56) References Cited

U.S. PATENT DOCUMENTS

| | | | |
|---|---|---|---|
| 3,720,153 A | 3/1973 | Jardinier et al. | |
| 3,918,523 A | 11/1975 | Stuber | |
| 4,137,970 A | 2/1979 | Laflin et al. | |
| 4,590,227 A | 5/1986 | Nakamura et al. | |
| 4,862,967 A | 9/1989 | Harris | |
| 4,936,386 A | 6/1990 | Colangelo | |
| 5,048,605 A | 9/1991 | Toon et al. | |
| 5,132,358 A * | 7/1992 | Watanabe et al. | 524/800 |
| 6,431,282 B1 | 8/2002 | Bosma et al. | |
| 6,581,682 B1 | 6/2003 | Parent et al. | |
| 6,834,725 B2 | 12/2004 | Whanger et al. | |
| 6,848,505 B2 | 2/2005 | Richard et al. | |
| 6,854,522 B2 | 2/2005 | Brezinski et al. | |
| 6,907,937 B2 | 6/2005 | Whanger et al. | |
| 6,935,432 B2 | 8/2005 | Nguyen | |
| 7,059,415 B2 | 6/2006 | Bosma et al. | |
| 7,121,352 B2 | 10/2006 | Cook et al. | |
| 7,143,832 B2 | 12/2006 | Freyer | |
| 2003/0234102 A1 * | 12/2003 | Brothers et al. | 166/293 |
| 2004/0020662 A1 | 2/2004 | Freyer | |
| 2004/0055758 A1 | 3/2004 | Brezinski et al. | |
| 2005/0077052 A1 | 4/2005 | Ohmer | |
| 2005/0110217 A1 | 5/2005 | Wood et al. | |
| 2005/0199401 A1 | 9/2005 | Patel et al. | |
| 2006/0005973 A1 | 1/2006 | Harrall et al. | |
| 2007/0027245 A1 | 2/2007 | Vaidya et al. | |
| 2008/0125335 A1 * | 5/2008 | Bhavsar | 507/219 |
| 2010/0041291 A1 * | 2/2010 | Weber et al. | 442/119 |
| 2010/0163252 A1 * | 7/2010 | Regnault De La Mothe et al. | 166/387 |
| 2010/0270016 A1 * | 10/2010 | Carelli et al. | 166/277 |
| 2011/0067889 A1 * | 3/2011 | Marya et al. | 166/386 |
| 2011/0253393 A1 * | 10/2011 | Vaidya et al. | 166/387 |
| 2011/0257333 A1 * | 10/2011 | Adam et al. | 524/839 |
| 2013/0075096 A1 * | 3/2013 | Khalfallah et al. | 166/294 |

FOREIGN PATENT DOCUMENTS

| | | |
|---|---|---|
| EP | 1407113 | 3/2006 |
| EP | 1669540 | 6/2006 |
| EP | 1649136 | 10/2006 |
| EP | 1672166 | 11/2007 |
| EP | 1978071 A1 | 10/2008 |
| WO | 02/20941 | 3/2002 |
| WO | 03/008756 | 1/2003 |
| WO | 2004/101951 | 11/2004 |
| WO | 2005/012686 | 2/2005 |
| WO | 2006/065144 | 6/2006 |
| WO | 2006/079659 | 8/2006 |
| WO | 2008/122372 | 10/2008 |

OTHER PUBLICATIONS

Wen-Fu Lee and Chan-Chang Tsai, "Synthesis and solubility of the poly(sulfobetaine)s and the corresponding cationic polymers: 1. Synthesis and characterization of sulfobetaines and the corresponding cationic monomers by nuclear magnetic resonance spectra", Polymer, 35 (10), 1994, pp. 2210-2217.

V.M. Monroy Soto and J.C. Galin, "Poly (sulphopropylbetaines): 1. Synthesis and characterization", Polymer, 1984, vol. 25, pp. 121-128.

P. Koberle and A. Laschewsky, "Hydrophobically Modified Zwitterionic Polymers: Synthesis, Bulk Properties, and Miscibility with Inorganic Salts", Macromolecules, 27, 1994, pp. 2165-2173.

V.M. Castano, A.E. Gonzalez, J. Cardoso, O. Manero, V.M. Monroy, "Evidence of ionic aggregates in some ampholytic polymers by transmission electron microscopy", J. Mater, Res., 5 (3), 1990 pp. 654-567.

J.C. Salamone, W. Volkson, A.P. Oison, S.C. Israel, "Aqueous solution properties of a poly (vinyl imidazolium sulphobetaine)", Polymer, 19, 1978, pp. 1157-1162.

P. Fabresse, A. Laschewsky, "New poly (carbobetaine)S made from zwiitterionic diallylammonium monomers", Macromolecular Chemistry and Physics, 200 (4), 1999, pp. 887-895.

Communication issued in related EP Application No. 10290212.9 mailed Jan. 19, 2016 (5 pages).

* cited by examiner

SYSTEM AND METHOD FOR IMPROVING ZONAL ISOLATION IN A WELL

FIELD

The present disclosure broadly relates to well cementing. More particularly, it relates to systems and methods for improving zonal isolation in downhole wells from a subterranean reservoirs, such as oil, gas or water reservoirs.

DESCRIPTION OF THE PRIOR ART

After a well has been drilled, the conventional practice in the oil industry consists in lining the well with a metal casing. Cement is pumped inside the casing and returns through the annulus, or annular space between the outside of the casing and the subterranean formation, where it is allowed to set. The lining serves a dual purpose: preventing the borehole walls from collapsing and isolating the various geological strata and, thus, avoiding exchange of fluids between them. However, there are situations where the set cement is unable to fulfil its entire functional role and fails the expected zonal isolation, the well thereby losing its integrity. Such situations occur when the cement slurry is not placed properly due to, for example, poor conditions of placement, poor or absence of centralization, slim holes, or incomplete mud removal contaminating the cement, that results in the formation of channels. Deficient zonal isolation may also occur during the lifetime of the well, the cement is exposed to pressure and/or temperature variations. In such cases, a microannuli may appear between the fluid conduit and the cement or between the cement and the formation, or the cement may even crack.

As it affects hydrocarbon production and therefore results in loss of revenues, losing well integrity has to be prevented.

Various solutions were proposed to solve the problem of well integrity. Especially, swellable materials are well known for annular zonal isolation in hydrocarbon wells. A swellable material is a material that can swell i.e. increases its volume or its apparent volume.

International application WO 2008/122372 describes a system comprising:—a tubular, preferably substantially cylindrical, containing a first surface comprising a coating made of a first swellable material coating said first surface, wherein said coating has a second surface and said first swellable material is able to swell in contact with a first fluid on said second surface, and—a composition made of a settable material and a second swellable material able to swell in contact with a second fluid. On the first hand, the swellable materials have the property to be able to move from a retracted position to an expanded position when exposed to the action of a triggering agent. The triggering agent is a fluid absorbed by the material that consequently swells. In its expanded position, the volume of the swellable material is greater than in its non-swollen position, which makes it able to fill adjacent spaces unoccupied prior to swelling and therefore to seal fluid channels in its vicinity. The swellable materials can be deployed downhole in their retracted position prior to swelling which is activated downhole. On the second hand, the composition can accommodate problems that occur once the set material sheath has failed. This responsive composition develops self healing properties in contact with the second fluid. It can self-repaired when contacted by hydrocarbon fluid liquids or gas or water fluids coming from the formation or any suitable triggering fluid pumped from surface.

The suitable swellable materials described in the above-referenced international application are essentially either water swellable, or hydrocarbon-swellable. Thus, depending on the fluids that are expected to contact the coating or the settable material, essentially water-swellable or essentially hydrocarbon-swellable materials are used.

Despite the many interesting contributions in the art, it would be advantageous to develop systems and methods for improving zonal isolation to seal the annular space between tubulars and the subterranean formation or another tubular in a hydrocarbon well, in which the swellable material would be swellable to hydrocarbons, water and brines.

SUMMARY

The present disclosure pertains to solutions to avoid and minimize zonal isolation issues by providing a reliable annular seal, in particular, between the casing and the formation. The present solutions are based on a technology comprising a swellable coating, which coats the casing. This coating is advantageously swellable. The swellable behavior of the coating is due to the incorporation of compounded elastomers in it. These elastomers are preferably compounded with an aqueous inverse emulsion of particles of a polymer comprising a betaine group. They are swellable to hydrocarbons, water and brines.

Hence, in embodiments, the disclosure concerns system for improving zonal isolation in a well in a subterranean formation, comprising:

a tubular having a outer surface; and a swellable coating coating the outer surface of said tubular, said swellable coating having an external surface;

wherein the swellable coating is made of a swellable material including an elastomer compounded with an aqueous inverse emulsion of particles of a polymer comprising a betaine group suitable to swell in contact with hydrocarbons, water and/or brines.

In further embodiments, the disclosure concerns method of improving zonal isolation in a well in a subterranean formation, comprising the steps of:

lowering, in the well, a tubular having an outer surface; and coating the outer surface of said tubular with a swellable coating having an external surface;

the swellable coating is made of a swellable material including an elastomer compounded with an aqueous inverse emulsion of particles of a polymer comprising a betaine group suitable to swell in contact with hydrocarbons, water and/or brines; and allowing the swellable coating to swell in contact with hydrocarbons, water and/or brines.

By "elastomer compounded with an aqueous inverse emulsion of particles of a polymer comprising a betaine group" it is to be understood in the present context: an inverse emulsion comprising a continuous oil-phase, a discontinuous aqueous-phase and particles of polymers dispersed in said aqueous-phase.

BRIEF DESCRIPTION OF THE DRAWINGS

Further features and aspects will be apparent from the following description and the accompanying drawings, in which.

DETAILED DESCRIPTION

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary and this detailed description, each numerical value should be read once as modified by the term "about" (unless already expressly so modified), and then read again as not so modified unless otherwise indicated in context. Also, in the summary and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possessed knowledge of the entire range and all points within the range.

The role of the cement placed between the casing and the wellbore wall in a hydrocarbon well is primarily to provide mechanical support to the casing and to ensure accurate annular zonal isolation. However, due to poor cement placement, or to stresses applied by both the casing and the formation, the cement may fail in ensuring well integrity. Examples of zonal isolation issues are described below.

Figure 1A:
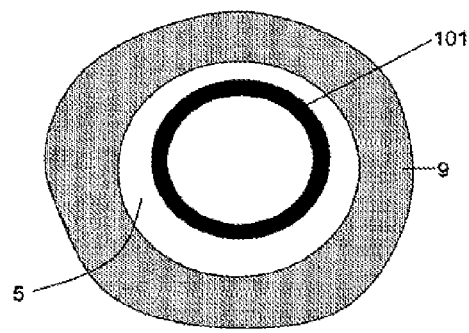
FIGS. 1A and 1B show an example of an annulus left by a casing not properly centralized.
Figure 1B:
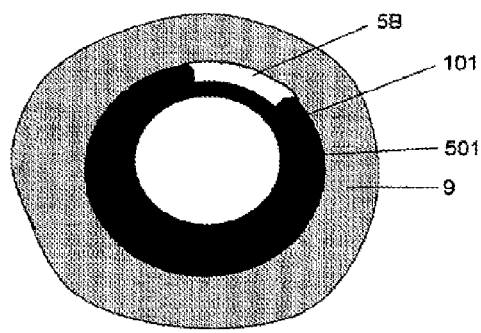

A first example relates to eccentric well geometries. It is illustrated, for example, in FIGS. 1A and 1B. As appearing in these figures, in a well, in subterranean formation 9, a casing 101 is placed to consolidate the formation. When the casing 101 is not centralized in the borehole, the eccentricity can be such that the cement cannot be placed properly in an annular space or annulus 5 between the casing 101 and the wellbore wall. As a result, the annulus 5 between the casing 101 and the formation 9 is only partly filled with the cement 501, leaving portions of the annulus 5B not filled with cement (FIG. 1B).

Figure 2A:
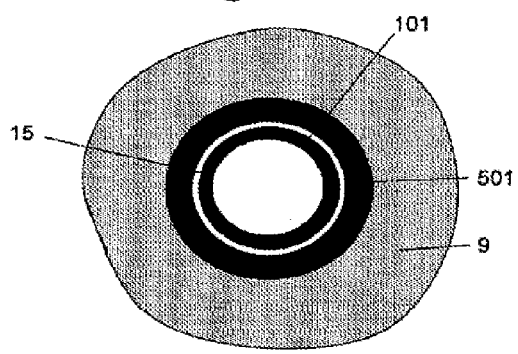
FIGS. 2A and 2B show two examples of microannuli.
Figure 2B:
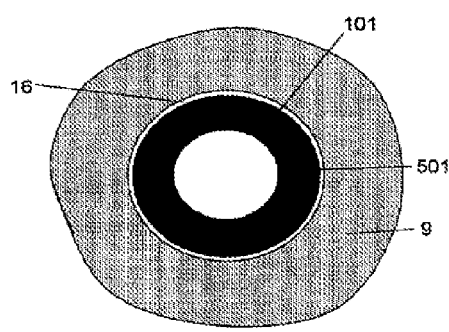

Another example of zonal isolation issue relates to the formation of microannuli as shown on FIGS. 2A and 2B. Microannuli 15, 16 may appear either between the casing 101 and the cement 501 (15, FIG. 2A) or between the formation 9 and the cement 501 (16, FIG. 2B). For instance, bad drilling-mud removal may occur while pumping the cement slurry in the annulus, thereby leaving mud films either between the casing 101 and the cement 501 or between the cement 501 and the formation 9. This results in fluid channelling and loss of zonal isolation. Both types of microannuli may also appear during the cement lifetime due to cement debonding.

Figure 3:
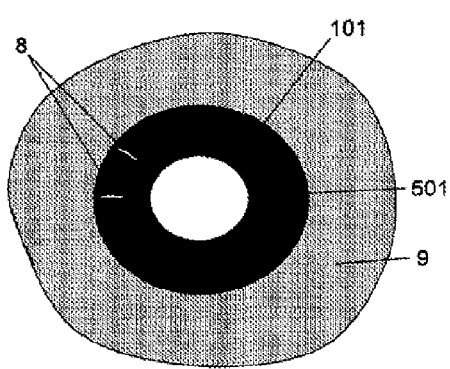
FIG. 3 shows an example of cracks in cement.

A more complex zonal isolation issue consists in cracks 8 in the cement 501 as shown on FIG. 3. Cracks 8 develop due to cement e.g. ageing, seismologic activity in the formation or vibrations of the casing or pressure/temperature variation.

In the disclosure, a system is provided in order to improve zonal isolation in a well in a subterranean formation. This system comprises a flexible swellable coating attached to a tubular made of a first swellable material additionally a settable composition might also be present, more particularly, an adaptive cement comprising a swellable material, said composition being placed in the annulus between the coated tubular, and the formation wall.

In embodiments such as for example FIGS. 4 to 8A and 8B, the system comprises both, a swellable coating and a composition which is a settable composition that is swellable. However, the scope of the disclosure is to be understood as encompassing embodiments wherein the system does not comprise any additional swellable composition but a swellable coating only.

Figure 4:
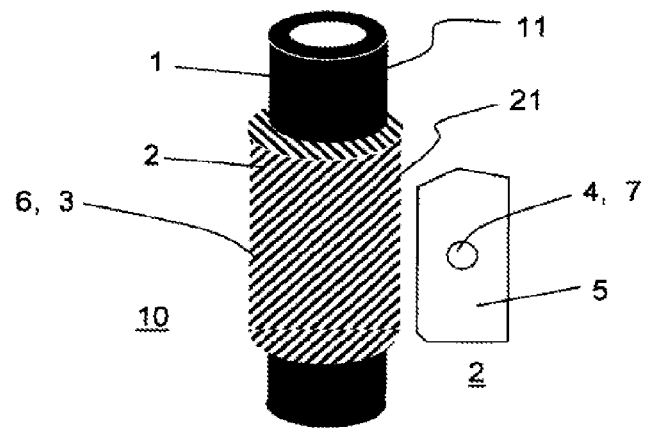
FIG. 4 illustrates a system according to the present disclosure.

In FIG. 4, the system 10 comprises a tubular 1 that has an internal surface and an outer surface 11. The tubular 1 is preferentially substantially cylindrical with a thickness t. It bears the coating 2 made of the first swellable material 3 able to swell in contact with a first fluid 6. The coating 2 has an internal surface and an external surface 21. It is preferentially substantially cylindrical with a thickness t1 and is preferentially securely attached to the outer surface 11 of the tubular 1 via its inner surface. Attachment may be achieved by any type of system such as glue, hot melting, hot vulcanization, screwing, interlocking or even a dual-lock mechanical system e.g. Velcro. In the latter case, the attachment means of the assembly may comprise one half of the system and the tubular being prepared with bands comprising the second half of the dual mechanical system on which the tape assembly can be attached to. The coating could be regularly placed around the tube or down the entire length of the tubular. In a preferred embodiment, the assembly is made of hook and loop fasteners made of spring steel. These fasteners are resistant to chemicals and can withstand a tensile load of up to 35 tonnes per square meter at temperatures as high as 800° C. Suitable fastener are disclosed in Technische Universitaet Muenchen (2009, September 7). Metaklett, A Steely Hook And Loop Fastener. ScienceDaily.

The first swellable material 3 is able to swell in contact with the first fluid 6. Swellable materials means that the material when in contact with a suitable fluid can swell, i.e. increases its volume or its apparent volume. Preferably, the first swellable material 3 remains in the swollen state when still subjected to the first fluid 6. Advantageously, the first swellable material 3 includes an elastomer compounded with an aqueous polymer inverse emulsion of particles of a polymer comprising a betaine group, said elastomer being able to swell in contact with hydrocarbon, water and/or brines. The first fluid 6 is any type of hydrocarbon water or brines and mixtures thereof, which may be liquid, gaseous or multiphasic. In a further embodiment, the first fluid is a hydrocarbon, water and/or brines coming from the formation, from the wellbore, or is a fluid pumped from surface.

The coating 2 is preferentially entirely made of a uniform layer of swellable material coating the tubular, with a thickness t1 between 0.2 millimeters and 10 centimeters. The coating 2 is also preferentially flexible. By flexible it is meant that the coating has an elasticity allowing a deformation of the geometry when subjected to stress or tension. It is therefore able to distribute the stress load from the tubular thereby decreasing the stresses on the settable material. So, the risk of crack formation is reduced by the presence of the flexible coating around the tubular, its role being inter alia to spread the stress load applied on the settable material. Crack formation in the set material is therefore reduced. The material of the coating may be made of a hydrocarbon-swellable elastomer, oil swellable, water swellable or gas swellable or a combination thereof. It may be made of a composite material and comprise further other materials. For example, it may include fillers. The fillers may be water-swellable, gas-swellable, oil-swellable or swellable to both oil and water or/and gas.

In further embodiments (not shown on the figures), the coating 2 may comprise further other different swellable materials, e.g. a gas swellable material. Also, the coating 2 may comprise further other coatings made of different swellable materials i.e. multi-layer coatings made of various swellable materials.

In further embodiments (not shown on the figure), the coating 2 may comprise further a protective coating. The protective layer surrounds the first swellable material or the coating 2 and its purpose is to prevent and/or delay contact between the first swellable material 3 and the first fluid 6. In this way, premature swelling is prevented and time for deployment of the tubular is allowed. The second layer is preferably a uniform layer coating the coating 2, with a thickness t2 between 20 micrometers to 5 centimeters, and more preferably between micrometers to 1 millimeter. For example, the protective layer degrades or slowly swells to become partially permeable and allow activation fluid transfer towards the swellable coating. Deactivation of the protective layer may be triggered by several factors such as time, temperature, pressure, variations of pH or salinity changes. The trigger may also be stimulated by electromagnetic waves, as for example, optic, magnetic or electric, inducing chemical activation or acoustic waves inducing morphologic change of the layer i.e. break of the protective coating. For instance, if the settable material is cement, deactivation of the protective layer may be triggered by the high pH of the cement slurry. After the cement slurry has been pumped into the well, the protective layer becomes in close contact with the cement slurry. Its high pH may then initiate the chemical degradation of the protective layer. This would only occur when the cement slurry is pumped into the well, thereby ensuring that swelling of the coating is delayed until the cement has been properly placed in the annulus.

The systems disclosed comprise a composition made of a settable material 5 and optionally a second swellable material 4 including preferentially an elastomer compounded with an aqueous inverse emulsion of particles of a polymer comprising a betaine group. The composition is provided in the annular space outside the tubular 1, between said tubular 1 advantageously coated by the swellable coating 2. The second swellable material 4 is able to swell in contact with the second fluid 7. Preferably, the swellable material remains in the swollen state when still subjected to the second fluid 7. The fluid 7 is any type of fluid, which may be liquid or gaseous or multiphasic. The first and the second fluids 6, 7 may be the same or different. Preferably, the second fluid is aqueous or non-aqueous e.g. water, oil or hydrocarbon-based fluids or a combination thereof. Preferably also, the second swellable material 4 is substantially inactive during reaction of the first fluid 6 with the first swellable material 3. In this way, it exists a delay in activation process of the swellable materials: firstly, the coating 2 activates and, later, the swellable material activates within the settable material. Accordingly, the settable material 5 is preferentially set when activation of the second swellable material 4 occurs.

The settable material is of any type of material that has the ability to go from a fluid state to a solid state with time, temperature, pressure changes, or under any physical or chemical stimulus. Examples of settable materials are: cement, microcement, geopolymer, mixture of cement and geopolymer, plaster, resin, phosphomagnesium cement or Chemically Bonded Phosphate Ceramics (CBPCs). Preferably, the settable material is a cementing composition 501 comprising a hydraulic binder, in general based on Portland cement (or another type of hydraulic material) and water. Depending on the specifications regarding the conditions for use, the cementing compositions can also be optimized by adding additives common to the majority of cementing compositions such as dispersing agents, antifoaming agents, expansion agents (for example calcium oxide or magnesium oxide), fluid loss control agents, gas migration control agents, gas generating agents, retarders, accelerators or still anti-settling agents, or additives of the type. Advantageously, formulations are preferably based on Portland cement in classes A, B, C, G and H as defined by ISO/API standards. Classes G and H Portland cements are preferred but other cements which are known in this art can also be used. For low temperature applications, aluminous cements and Portland/plaster mixtures or cement silica mixtures for wells exceeding 120 deg° C. can be used.

The second swellable material 4 is able to swell in contact with the second fluid 7. As disclosed previously, when the settable material is cement, the second swellable material is embodied preferably as rubber, in particular styrene butadiene rubber and ground rubber, poly 2,2,1-bicyclo-heptene (polynorbornene), alkylstyrene, crosslinked substituted vinyl-acrylate copolymers, EPDM (elastomeric terpolymer from ethylene, propylene and non-conjugated diene) and diatomaceous earth. It may constitute a compounded elastomer as disclosed herein. Mixture of two or more of these materials can also be used, in particular to provide cement that is susceptible to react to a large variety of subterranean hydrocarbons. The composition made of the cement and the second swellable material can also be called an adaptive cement system. Adaptive cement systems refers to cement systems which are self-healing or self-repairing, i.e. systems which can adapt to compensate for changes or faults in the physical structure of the cement, or which adapt their structure in the cementing of oil, gas, water or geothermal wells, or steam injection wells or wells with Enhanced Oil Recovery (EOR) or gas storage wells or the like. In addition to the specific self-healing additives able to swell in contact with reservoir fluid (hydrocarbon and/or water), the material can be preferably flexible. In this way, the potential combination of flexibility and toughness extends the range of mechanical properties of the settable system and swellable material to extreme conditions. In embodiments, the adaptive cement design can also contain flexible particles and/or fibers to improve respectively the flexibility and the toughness of the set material.

Various type of geometry may be used for the second swellable material: substantially spherical, ovoid, made in rods or in fibers.

In further embodiments (not shown on Figure), the settable material 5 may comprise a plurality of various swellable materials.

In yet further embodiments (not shown on Figure), the second swellable material 4 may further comprise a protective coating of the type already disclosed above. The protective layer surrounds the second swellable material and its purpose is to prevent and/or delay contact between the second swellable material 4 and the second fluid 7 and/or the first fluid 6. In this way, premature swelling is prevented and time for activation of the second swellable material 4 is allowed. When the second swellable material 4 constitutes particles that are substantially spherical, the protective layer is preferably a uniform layer coating each particle, with a thickness $t_3$ between 20 to 60 micrometers.

Figure 5A:
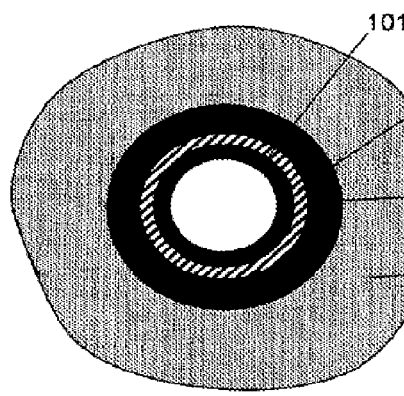
FIGS. 5A and 5B show a system placed in the well.
Figure 5B:
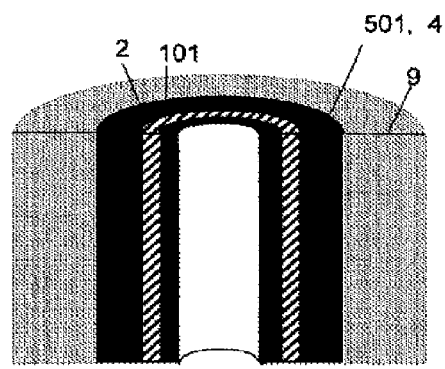

The tubular 1 may be used as a conventional casing 101 during normal primary cementing operations, as illustrated in FIG. 5A and FIG. 5B. The casing 101 is embodied as the tubular 1 described herewith, comprising the flexible swellable coating 2. The casing 101 is lowered down into the wellbore delimited by the formation 9. A cement slurry 501 comprising the second swellable material 4 is pumped into the annulus between the coating 2 and the wellbore wall. The cement finally sets and, in swelling, the coating 2 bridges the gaps not filled with cement, particularly the microannuli and the narrow side of the annulus in non-centralized configurations. The sealing of the fluid channels is achieved when the coating 2 swells such that the swollen volume of the coating equals or tends to be greater than the size of the channel to seal. As a result, a differential pressure develops across the swellable coating, which directly correlates with the sealing performance of the system. The flexible coating is also able to distribute the stress load from the casing 101 thereby decreasing the stresses on the cement. Thus, the risk of crack formation is reduced by the presence of the flexible coating around the casing, its role being to spread the stress load applied on the cement. The use of a swellable and flexible coating 2 around the casing 101 associated with an adaptive cement 501 extends good zonal isolation in difficult cases encountered where the cement has not been placed properly (poor placement, poor or absence of centralization, slim holes, incomplete mud removal) and when the cement is likely to fail (development of microannuli, cracks). The flexible swellable coating 2 can be placed on the whole length of the casing or on smaller portions. It may comprise one layer or several layers of swellable material. It may also be reinforced.

After the second swellable material 4 is allowed to swell in contact with reservoir fluids the adaptive cement prevents and repairs losses of well integrity when they occur after placement and during life of the well. The activation will occur naturally by direct contact of the second swellable material and fluid when damage in the cement matrix will be sufficient to create a pathway in the cement matrix between fluids from the reservoir and the second swellable material. For this aim the second swellable material has to be able to be activated when the damages will occur: either the second swellable material is present in sufficient amount or the second swellable material is protected, so that during reaction of the first swellable material 3 with the first fluid 6 and/or during setting of the settable material e.g. cement, the second swellable material is substantially inactive. The second swellable material may be rendered inactive directly by using a protective coating as disclosed above.

Methods presently disclosed may be used for various types of application: it covers primary cementing, steam injection, Steam Assisted Gravity Drainage (SAGD), plug and abandonment, geothermal wells, gas storage well, heavy oil or any type of application that the skilled in the art may think of.

Figure 6A:
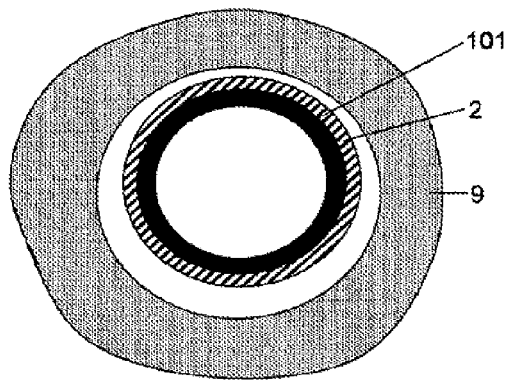
FIGS. 6A, 6B and 6C show a system dealing with the zonal isolation issue of FIG. 1B.
Figure 6B:
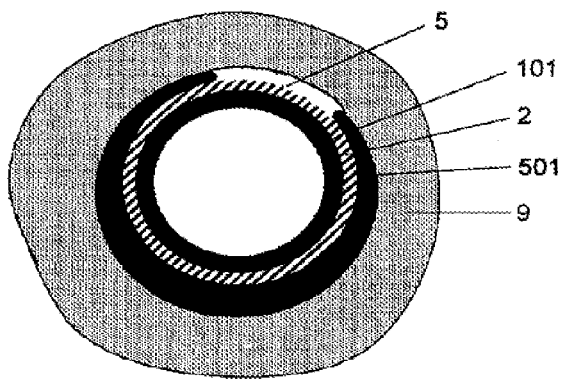
Figure 6C:
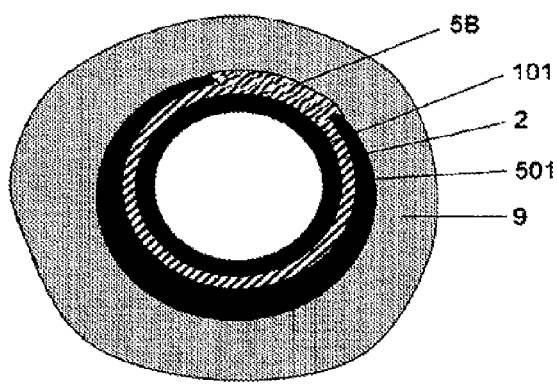

Accordingly, FIGS. 6A, 6B and 6C show inventive systems treating the zonal isolation problem of FIG. 1B. The casing 101 with the coating 2 is lowered in a non-centralized configuration. FIG. 6B shows the well after primary cementing operation has been conducted. The cement 501 has not been placed properly, leaving a space 5B not filled with cement. The swellable coating 2 absorbs the fluid present in gap 5B and swells, thereby sealing the channel. FIG. 6C shows the coating 2 having expanded and sealed the gap 5B.

Figure 7A:
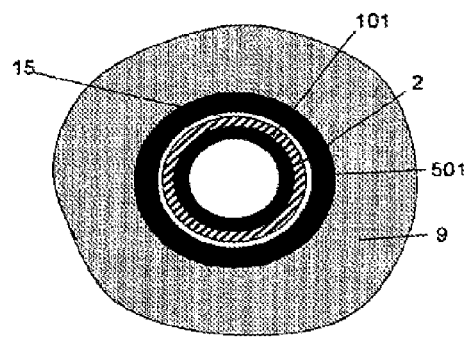
FIGS. 7A and 7B show a system dealing with the zonal isolation issue of FIG. 2A.
Figure 7B:
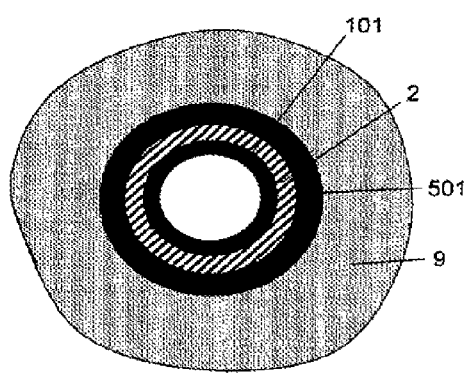

Accordingly, FIGS. 7A and 7B show systems for treating, for example, the zonal isolation problem of FIG. 2A. A microannulus 15 is formed between the swellable coating 2 and the cement 501. The presence of the microannulus may result from a bad mud removal or debonding of the cement during its lifetime. The swellable coating 2 is again able to absorb fluids present in the microannulus 15 and to swell and seal the created channel, as shown in FIG. 7B.

Figure 8A:
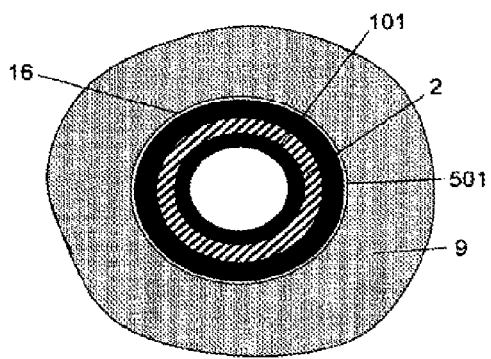
FIGS. 8A and 8B show the system dealing with the zonal isolation issue of FIG. 2B.
Figure 8B:
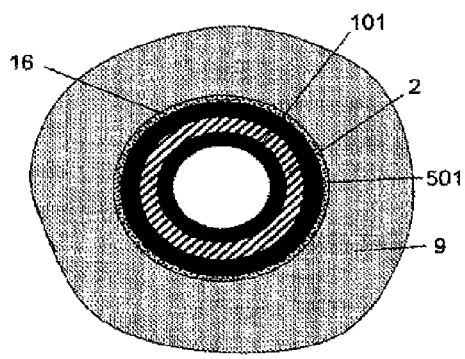

Accordingly, FIGS. 8A and 8B show systems for treating, for example, the zonal isolation problem of FIG. 2B. A microannulus 16 is formed between the cement 501 and the formation wall 9. Again, the presence of the microannulus may result from a bad mud removal or debonding of the cement during its lifetime. Sealing of the created channel 16 is achieved by the auto-repairing action of the adaptive cement, as shown in FIG. 8B.

Accordingly, to treat the zonal isolation problem of FIG. 3, formed by cracks 8, the auto-repairing action of the adaptive cement is also used. Those cracks may form in the cement during its lifetime.

The elastomer, which constitutes either the first swellable material 3 or the second swellable material 4 or both of them, is preferably compounded with an aqueous inverse emulsion of particles of a polymer comprising a betaine group, and is thus able to swell both in contact with hydrocarbons, water and/or brines. The polymer comprising a betaine group is prepared by inverse emulsion polymerization of monomers $A_b$ comprising a betaine group, optionally other monomers $B_a$ and a small quantity of polyvalent, preferably divalent or trivalent monomers $C_a$, comprised in an aqueous phase dispersed in the form of droplets in a hydrophobic external phase having hydrophobic surfactants, the molar ratio of the monomers $A_b$ to the optional monomers $B_a$ being between 4/96 and 40/60, preferably 7/93 and 30/70, the molar ratio of the polyvalent, preferably divalent or trivalent monomers $C_a$ per mole of polymer which would have been obtained without the addition of monomers $C_a$, being between 1.5 and 10, preferably between 2 and 4.

It is noted that, in the following description, the terms "hydrophilic", "water soluble" and "hydrodispersable" are used in their usual sense of "who has affinity for water", i.e. not capable of forming a macroscopic two-phase solution in distilled water at 25° C. at a concentration greater than 1% by weight.

The terms "polymer which would have been obtained without the addition of monomers $C_a$" means the polymer obtained by carrying out the same process with the same monomers except that the monomer $C_a$ is not used.

The terms "elastomer rubber" and "elastomeric composition" include any rubber or composition having desired elastomeric and swelling properties for the intended purpose of making an expandable elastomeric material in the presence of water and brine or oil. For example, in some embodiments, an elastomeric composition may comprise substantially all elastomers, while, in other formulations, the elastomer may be accompanied by one or more other polymeric or non-polymeric compositions, such as thermoplastic and thermoset polymers, plasticizers, fillers, shape stabilizers, and the like.

The term "brine" means any aqueous medium containing dissolved salts like industrial solutions, sea water, sewage fluids. Most common salts are alkaline or earth-alkaline chlorides, sulphates and carbonates.

The elastomeric composition may further comprise additives, fillers, and the like, depending on the end use of the swellable/expandable elastomer.

Unless otherwise indicated, the term "molecular weight", means the average molecular weight in absolute mass, expressed in g/mol. That molecular weight can be determined by aqueous gel permeation chromatography (GPC), diffusion of light (DDL or MALLS for an aqueous eluent), with an aqueous or organic eluent (i.e. formamide) depending upon the composition of polymer.

The reduced specific viscosity is measured by dissolving the polymer in a 20% by weight aqueous NaCl solution. The intrinsic viscosity η is then obtained by linear extrapolation of the reduced specific viscosity to zero concentration of polymer. The slope of this extrapolation is equal to k'(η)$^2$, k' being the Huggins coefficient. This method of calculating η is described in detail in the publication Polymer Handbook (4$^{th}$ edition), J. Brandrup, E. H. Immergut and E. A. Grulke, Wiley (1999), cited as reference. This specific viscosity makes it possible to have indirect access to the molecular weights of greater than approximately 2 000 000, which cannot be directly determined experimentally.

For the preparation of the elastomer, a reactive monomer to chemical functions present in the elastomer is advantageously added to the aqueous emulsion before its addition to said elastomer.

Preferably, the particles of polymer have a particle size of between 10 to 1 000 000 nm, and, more preferably between 100 000 nm and 900 000 nm.

It is recommended to use 1 to 49% by weight of the aqueous inverse emulsion for 99 to 51% by weight of elastomer, said inverse emulsion preferably comprising between 10 and 40% by weight of water. The monomer $C_a$ is used molar ratio of the polyvalent, preferably divalent or trivalent monomers $C_a$ per mole of polymer which would have been obtained without the addition of monomers $C_a$, being between 1.5 and 10, preferably between 2 and 4, which represents most of the time fact a small quantity of monomer $C_a$. Examples of a small quantity of polyvalent, preferably divalent or trivalent monomers $C_a$ defined otherwise is a quantity comprised between 0.001 and 0.1 mol %, preferably between 0.002 and 0.02 mol %.

The aqueous inverse emulsion can be further partially dehydrated and de-oiled in the form of a dry solid, preferably a dried powder, containing the hydrophilic polymer and its hydrophobic surfactants. That partial or total dehydratation and de-oiling can be spray drying or drying by blowing hot air on the emulsion coated on a flat surface like a plate, wherein water and then oil is partially or totally eliminated. The surfactants used for the stabilization of the polymer in the inverse emulsion polymerization process are most useful to the polymer redispersion in hydrophobic media. In that case, the redispersion of the polymer in any oil is easy to carry out without extensive mixing. It is also possible to obtain the dehydrated polymer without the surfactants by mixing the inverse emulsion with a compound which is a no-solvent of the polymer, preferably by pouring the inverse emulsion in that compound being a no-solvent of the polymer and dissolving at least partially the other components of the inverse emulsion. An example of such a compound is acetone. The use of that dried aqueous inverse emulsion is recommended for the preparation of the swellable/expandable coatings.

Suitable swellable elastomers, include acrylic acid type polymers, carboxymethyl cellulose type polymers, highly swelling clay minerals, isobutylene maleic anhydride, polyethylene oxide polymers, polyvinyl alcohol cyclic acid anhydride graft copolymer, sodium bentonite (montmorillonite), starch polyacrylate acid graft copolymer, starch polyacrylonitrile graft copolymers, vinyl acetate-acrylate copolymers, and combination thereof. More generally, they can also include SAP (Super Absorbent Polymer) or hydrogels. Other suitable elastomers include natural rubber, polyisoprene rubber, vinyl acetate rubber, polychloroprene rubber, acrylonitrile butadiene rubber, hydrogenated acrylonitrile butadiene rubber, styrene budadiene styrene block copolymer styrene isoprene styrene block copolymer, styrene ethylene butylene styrene block copolymer, ethylene propylene diene monomer, ethylene propylene monomer rubber, polynorbornen, styrene butadiene rubber, styrene/propylene/diene monomer, brominated poly(isobutylene-co-4-methylstyrene) (BIMS), butyl rubber, chlorosulphonated polyethylenes, polyacrylate rubber, polyurethane, silicone rubber, brominated butyl rubber, chlorinated butyl rubber, chlorinated polyethylene, epichlorohydrin ethylene oxide copolymer, ethylene acrylate rubber, ethylene propylene diene terpolymer rubber, sulphonated polyethylene, fluoro silicone rubbers, fluoroelastomer, substituted styrene acrylate copolymer and combination thereof.

Preferentially, the elastomers, that are compounded according to the present disclosure, are:

a silicone and, preferably, a mono-component room temperature vulcanisable silicone (RTV-1 type) curing with the ambient humidity of atmospheric air and comprising a hydrolysable silane and an alpha,omega-dihydroxy silicone oil. That silicone RTV-1, compounded with the dried copolymer inverse emulsion, present good swelling in aromatic oils presents a good swelling in water and brine;

a polyurethane rubber and, preferably, a polyurethane rubber based on the curing of an isocyanate functionalized polybutadiene system with a polybutadiene chain extender. That polyurethane, compounded with the dried copolymer inverse emulsion, present good swelling in aromatic oils; and an EPDM rubber or a nitrile rubber.

The aqueous inverse emulsion of the polymer is prepared by an inverse polymerization process comprising the following steps:

a1): preparation of the inverse emulsion, and
a2): polymerization.

Step a1) is carried out by emulsification of a mixture comprising the aqueous phase comprising the monomers, the external phase and at least one emulsifying agent. The polymerization is carried out by bringing together the monomers $A_b$ and, optionally other monomers $B_a$ and the small quantity of polyvalent monomers $C_a$, with a compound which generates free radicals and the polymerization is carried out at a temperature between, for example, ambient temperature and 75° C., depending upon the initiating system chosen.

Use may be made of any inert hydrophobic liquid, for example aliphatic and aromatic hydrocarbons and halocarbons, such as toluene, xylene, o-dichlorobenzene, perchloroethylene, hexane, heptane, kerosene, a mineral oil and Isopar M, a substance of isoparaffin type of high purity sold by Exxon™ Corporation. Likewise, use may be made of any conventional water-in-oil emulsifying agent, such as hexadecyl sodium phthalate, sorbitan monooleate, sorbitan monostearate, mono- and diglycerides, polyethoxylated sorbitol hexaoleate, octyl sodium phthalate or stearyl sodium phthalate. The preferred emulsifying agents are sorbitan monooleate. These emulsifying agents constitute from 0.5% to 10% approximately, preferably from 1% to 5% approximately, by weight of the emulsion.

The ratio of the aqueous phase to the oil phase can vary within wide limits. Generally, the water-in-oil emulsions comprise from 20% to 80% approximately of aqueous phase and thus between 80% and 20% approximately of oil phase, these percentages being based on the total weight of the water-in-oil emulsion. A preferred ratio of the aqueous phase to the oil phase is 70 to 75% approximately of the aqueous phase for 30-25% approximately of the oil phase, percentages based on the total weight of the water-in-oil emulsion.

As mentioned above, the polymerization is initiated by means of a chemical initiator comprising free radicals. This initiator can be dissolved either in the oil phase or in the aqueous phase, according to its solubility characteristics. Mention may be made, as examples of water-soluble initiators, of 4,4'-azobis[4-cyanovaleric acid] (abbreviated to ACVA), potassium persulphate ($K_2S_2O_8$) and t-butyl hydroperoxide.

Examples of oil-soluble initiators are azobisisobutyronitrile (AIBN) or 2,2'-azobis(2,4-dimethylvaleronitrile) (ADVN). Use may also be made of water-soluble initiators of redox type, such as bromate/bisulphite or metabisulphite (for example, $KBrO_3$/$NaHSO_3$ or $KBrO_3$/$NaS_2O_5$) or persulphate/bisulphite initiators. The proportion of chemical initiator used depends on several factors. If, thus, it is necessary to maintain a desired reaction rate, the proportion of initiator has to be increased as the reaction temperature falls. By adjusting the reaction temperature and the proportion of initiator, it is possible to carry out the polymerization in a reasonable time and with a reasonable conversion of monomer to polymer, retaining the advantages of a polymerization at low temperatures.

The polymer is provided in any practical form, for example, directly in the form of the inverse emulsion as obtained by the polymerization process, or in the form of in the dry solid form or in the vectorized form, for example in the form of a solution or of an emulsion or of a suspension, in particular in the form of an aqueous solution. The vectorized form, for example an aqueous solution, can in particular comprise from 15 to 50% by weight, for example from 20 to 30% by weight, of the polymer.

The betaine group is a group composed of the following monomers:
  alkylsulphonates or -phosphonates of dialkylammonio-alkyl acrylates or methacrylates, -acrylamides or -methacrylamides, such as:
  sulphopropyldimethylammonioethyl methacrylate, sold by Raschig under the name SPE:

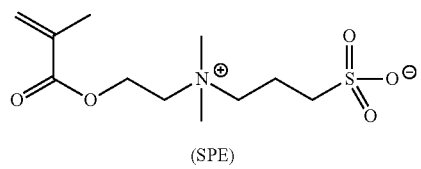 [SMILES: C=C(C)C(=O)OCC[N+](C)(C)CCCS(=O)(=O)[O-]]

(SPE)

sulphoethyldimethylammonioethyl methacrylate and sulphobutyldimethylammonioethyl methacrylate:

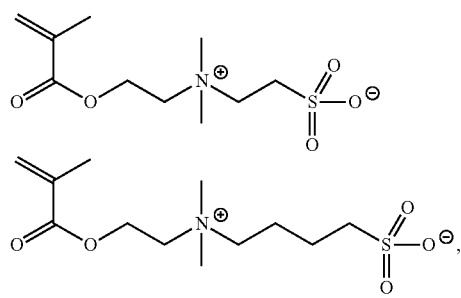

the synthesis of which is described in the paper "Sulfobetaine zwitterionomers based on n-butyl acrylate and 2-ethoxyethyl acrylate: monomer synthesis and copolymerization behavior", Journal of Polymer Science, 40, 511-523 (2002),
  sulphohydroxypropyldimethylammonioethyl methacrylate:

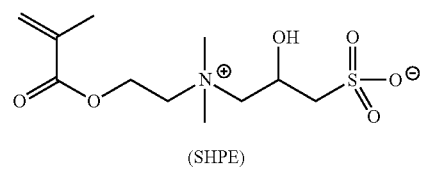 [SMILES: C=C(C)C(=O)OCC[N+](C)(C)CC(O)CS(=O)(=O)[O-]]

(SHPE)

sulphopropyldimethylammoniopropylacrylamide:

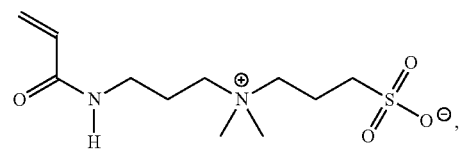 [SMILES: C=CC(=O)NCCC[N+](C)(C)CCCS(=O)(=O)[O-]]

the synthesis of which is described in the paper "Synthesis and solubility of the poly(sulfobetaine)s and the corresponding cationic polymers: 1. Synthesis and characterization of sulfobetaines and the corresponding cationic monomers by nuclear magnetic resonance spectra", Wen-Fu Lee and Chan-Chang Tsai, Polymer, 35 (10), 2210-2217 (1994),
  sulphopropyldimethylammoniopropylmethacrylamide, sold by Raschig under the name SPP:

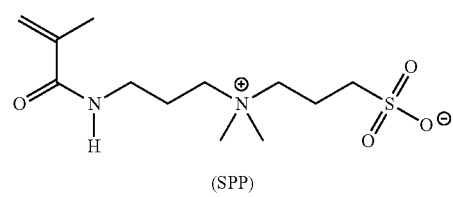

(SPP)

sulphopropyldimethylammonioethyl methacrylate, sold by Raschig under the name SPDA:

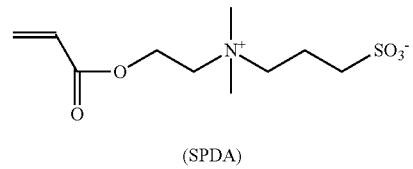

(SPDA)

sulphohydroxypropyldimethylammoniopropyl-methacrylamide:

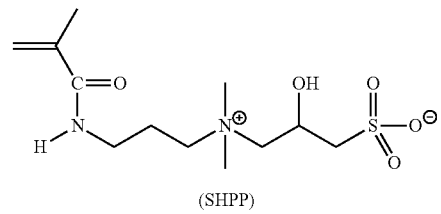 [SMILES: C=C(C)C(=O)NCCC[N+](C)(C)CC(O)CS(=O)(=O)[O-] ; "(SHPP)"]

(SHPP)

sulphopropyldiethylammonioethyl methacrylate:

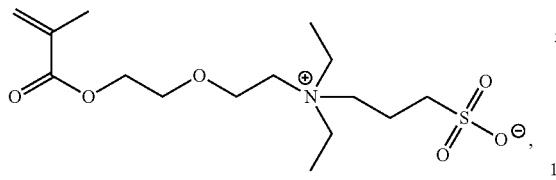

the synthesis of which is described in the paper "Poly(sulphopropylbetaines): 1. Synthesis and characterization", V. M. Monroy Soto and J. C. Galin, Polymer, 1984, Vol. 25, 121-128, sulphohydroxypropyldiethylammonioethyl methacrylate:

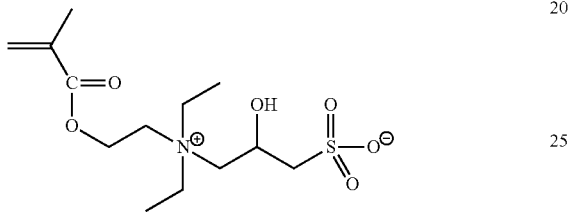

heterocyclic betaine monomers, such as:
sulphobetaines derived from piperazine:

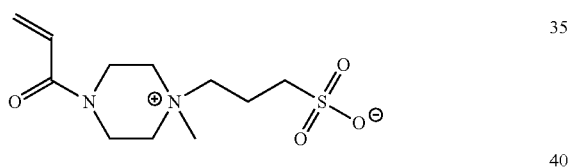

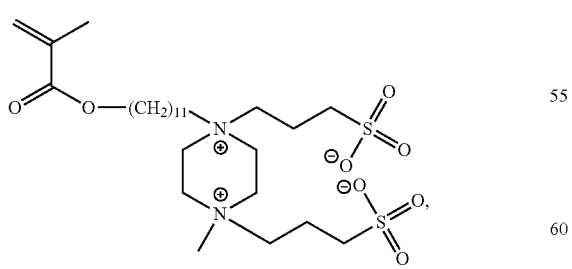

the synthesis of which is described in the paper "Hydrophobically Modified Zwitterionic Polymers: Synthesis, Bulk Properties, and Miscibility with Inorganic Salts", P. Koberle and A. Laschewsky, Macromolecules, 27, 2165-2173 (1994), sulphobetaines derived from 2-vinylpyridine and 4-vinylpyridine, such as
2-vinyl-1-(3-sulphopropyl)pyridinium betaine (2SPV or "SPV"), sold by Raschig under the name SPV:

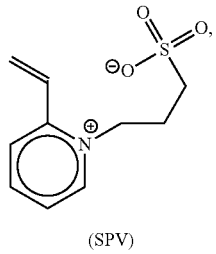

(SPV)

4-vinyl-1-(3-sulphopropyl)pyridinium betaine (4SPV), the synthesis of which is disclosed in the paper "Evidence of ionic aggregates in some ampholytic polymers by transmission electron microscopy", V. M. Castaño and A. E. González, J. Cardoso, O. Manero and V. M. Monroy, J. Mater. Res., 5 (3), 654-657 (1990):

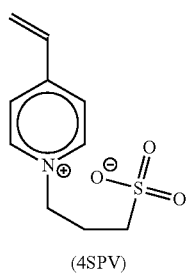

(4SPV)

1-vinyl-3-(3-sulphopropyl)imidazolium betaine:

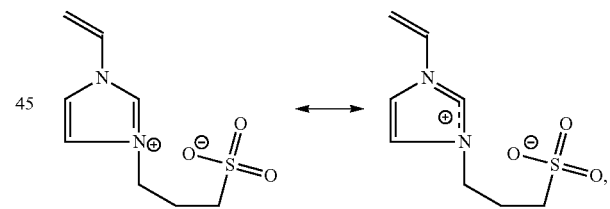

the synthesis of which is described in the paper "Aqueous solution properties of a poly(vinyl imidazolium sulphobetaine)", J. C. Salamone, W. Volkson, A. P. Oison, S. C. Israel, Polymer, 19, 1157-1162 (1978), alkylsulphonates or -phosphonates of dialkylammonioalkylallylics, such as sulphopropyl-methyldiallylammonium betaine:

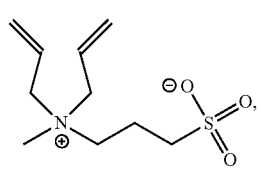

the synthesis of which is described in the paper "New poly(carbobetaine)s made from zwitterionic diallylammonium monomers", Favresse, Philippe; Laschewsky, Andre, Macromolecular Chemistry and Physics, 200(4), 887-895 (1999), alkylsulphonates or -phosphonates of dialkylammonio-alkylstyrenes, such as:

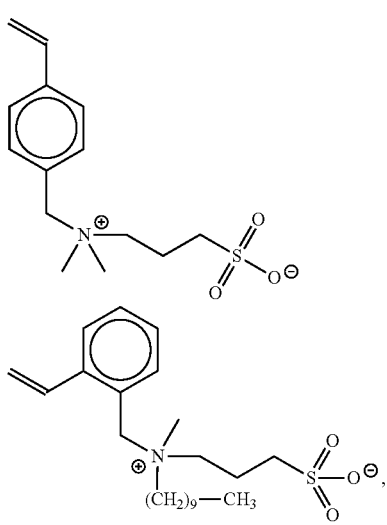

the synthesis of which is described in the paper "Hydrophobically Modified Zwitterionic Polymers: Synthesis, Bulk Properties, and Miscibility with Inorganic Salts", P. Koberle and A. Laschewsky, Macromolecules, 27, 2165-2173 (1994), betaines resulting from ethylenically unsaturated anhydrides and dienes, such as:

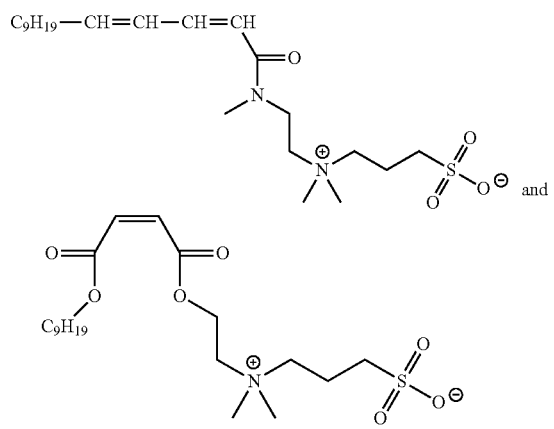

the synthesis of which is described in the paper "Hydrophobically Modified Zwitterionic Polymers: Synthesis, Bulk Properties, and Miscibility with Inorganic Salts", P. Koberle and A. Laschewsky, Macromolecules, 27, 2165-2173 (1994), phosphobetaines, such as:

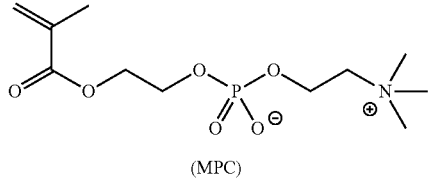 [SMILES: C=C(C)C(=O)OCCOP(=O)([O-])OCC[N+](C)(C)C]

(MPC)

or alternatively:

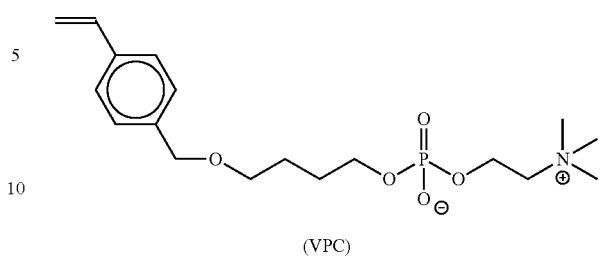

(VPC)

The synthesis of MPC and of VPC is described in EP 810 239 B1 (Biocompatibles, Alister et al.).

The betaines of formula:

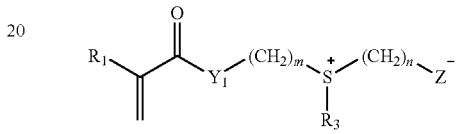

or of formula:

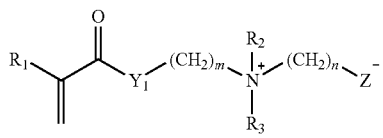

in which:
$R^1$ is hydrogen or methyl,
$R^2$ and $R^3$, which are identical or different, are hydrogen or alkyls having from 1 to 6 carbon atoms,
$Y_1$ is a divalent group of formula —O— or $NR_2$,
$Z^-$ is $SO_3^-$,
m is 2 or 3, and
n is 1-6,
are more particularly preferred.

The monomer $A_b$ is preferably:
sulphopropyldimethylammonioethyl methacrylate (SPE),
sulphoethyldimethylammonioethyl methacrylate,
sulphobutyldimethylammonioethyl methacrylate,
sulphohydroxypropyldimethylammonioethyl methacrylate (SHPE),
sulphopropyldimethylammoniopropylacrylamide,
sulphopropyldimethylammoniopropylmethacrylamide (SPP),
sulphohydroxypropyldimethylammoniopropylmethacrylamide (SHPP),
sulphopropyldimethylammonioethyl acrylate (SPDA),
sulphopropyldiethylammonioethyl methacrylate,
2-vinyl-1-(3-sulphopropyl)pyridinium betaine,
4-vinyl-1-(3-sulphopropyl)pyridinium betaine,
1-vinyl-3-(3-sulphopropyl)imidazolium betaine, or
sulphopropylmethyldiallylammonium betaine.

The monomer $A_b$ corresponds, for example, to one of the following formulae:

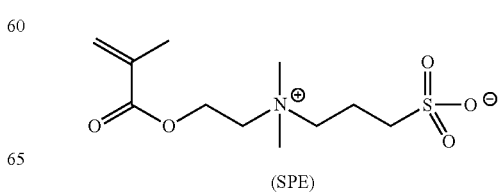

(SPE)

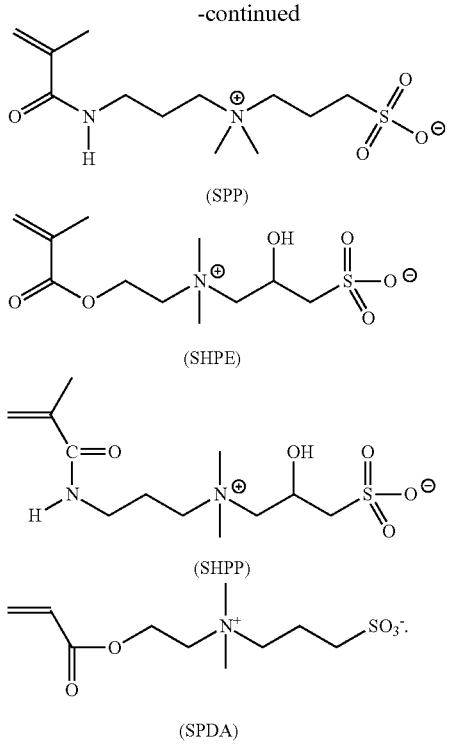

(SPP)

(SHPE)

(SHPP)

(SPDA)

Preferably the monomer $A_b$ is sulphopropyldimethylammonioethyl methacrylate (SPE) and SPP.

The polyvalent monomers are:

1,4-butanediol diacrylate, 1,4-butanediol dimethacrylate, poly(ethylene and/or propylene oxide), if appropriate random or in the block form, diacrylate or dimethacrylate, ethylene glycol diacrylate or dimethacrylate, propylene glycol diacrylate or dimethacrylate, dipentaerythritol pentaacrylate, pentaerythritol tetraacrylate, pentaerythritol triacrylate, trimethylolpropane triacrylate, divinyl esters of polycarboxylic acid, diallyl esters of polycarboxylic acid, triallyl terephthalate, diallyl maleate, diallyl fumarate, diallyl succinate, trimethylolpropane triacrylate, N,N'-ethylenebismethacrylamide, N,N'-ethylenebisacrylamide, N-[2-(acryloylamino)-1,2-dihydroxyethyl]acrylamide, 3-(3-[3-(acryloyloxy)-2-hydroxypropoxy]-2-hydroxypropoxyl-2-hydroxypropyl acrylate.

The polyvalent, preferably divalent or trivalent monomer is preferably N,N'-methylenebisacrylamide (MBA) or triacryloylhexahydrotriazine (TAHT).

The optional monomers Ba used alone or in a polymerizable mixture are preferably:

ethylenically unsaturated carboxylic acid and carboxylic acid anhydride;

ethylenically unsaturated carboxylic acid and carboxylic acid anhydride; or ethylenically unsaturated amine and cationic monomers.

Ethylenically unsaturated carboxylic acid and carboxylic acid anhydride monomers include, but not limited to, acrylic acid, methacrylic acid, ethacrylic acid, α-chloroacrylic acid, α-cyanoacrylic acid, 1-methylacrylic acid (crotonic acid), α-phenylacrylic acid, β-acryloxypropionic acid, sorbic acid, α-chlorosorbic acid, angelic acid, cinnamic acid, p-chlorocinnamic acid, β-stearylacrylic acid, itaconic acid, citraconic acid, mesaconic acid, glutaconic acid, aconitic acid, maleic acid, fumaric acid, tricarboxyethylene, 2-methyl-2-butene dicarboxylic acid, maleamic acid, N-phenyl maleamide, maleamide, maleic anhydride, fumaric anhydride, itaconic anhydride, citraconic anhydride, mesaconic anhydride, methyl itaconic anhydride, ethyl maleic anhydride, diethylmaleate, methylmaleate and maleic anhydride.

Ethylenically unsaturated hydroxide and non-ionic monomers include, but not limited to, hydroxyethyl acrylate, hydroxyethyl methacrylate, hydroxypropyl acrylate, hydroxypropyl methacrylate, glycidyl acrylate, glycidyl methacrylate, 2.3-dihydroxypropyl acrylate, 2.3-dihydroxypropyl methacrylate, acrylamide (AM), methacrylamide, N-methylolacrylamide, N-methylolmethacrylamide, N-(2-hydroxyethyl)acrylamide, N-(2-hydroxyethyl)methacrylamide, dimethylacrylamide, dimethylmethacrylamide, poly(ethylene and/or propylene oxide), if appropriate random or in the block form, α-acrylates or α-methacrylates, N-[2-hydroxy-1,1-bis(hydroxymethyl)ethyl]acrylamide, N-[2-hydroxy-1,1-bis(hydroxymethyl)ethyl]methacrylamide vinyl alcohol and vinylpyrrolidone.

Anionic monomers include, but not limited to, the salts of ethylenically unsaturated carboxylic acid and sulfonic acid include sodium(meth)acrylate, sodium itaconate, 2-acrylamido-2-methylpropane sulfonate, sodium styrene sulfonate, sodium vinylsulfonate, sodium allylsulfonate and sodium sulfomethyl(meth)acrylamide.

Ethylenically unsaturated amine and cationic monomers include, but not limited to dimethylaminoethyl(meth)acrylate or (meth)acrylamide, trimethylaminoethyl(meth)acrylate or (meth)acrylamide salts, dimethylaminopropyl(meth)acrylate or (meth)acrylamide, trimethylaminopropyl(meth)acrylate or (meth)acrylamide salts, diethylaminoethyl(meth)acrylate or (meth)acrylamide and diallyldimethylammonium salts.

The polymers are thus prepared by an inverse polymerization process which comprises the following steps:

1): preparation of the inverse emulsion, and
2): polymerization.

Step 1) is carried out by emulsification of a mixture comprising the aqueous phase comprising the monomers, the external phase and at least one emulsifying agent. The polymerization is carried out by bringing together the monomers $A_b$ and optionally the monomers $B_a$ with a compound which generates free radicals and the polymerization is carried out at a temperature between, for example, ambient temperature and 75° C., depending on the initiating system chosen.

Use may be made of any inert hydrophobic liquid, for example aliphatic and aromatic hydrocarbons and halocarbons, such as toluene, xylene, o-dichlorobenzene, perchloroethylene, hexane, heptane, kerosene, a mineral oil and Isopar M, a substance of isoparaffin type of high purity sold by Exxon™ Corporation. Likewise, use may be made of any conventional water-in-oil emulsifying agent, such as hexadecyl sodium phthalate, sorbitan monooleate, sorbitan monostearate, mono- and diglycerides, polyethoxylated sorbitol hexaoleate, octyl sodium phthalate or stearyl sodium phthalate. The preferred emulsifying agents are sorbitan monooleate. These emulsifying agents constitute from 0.5% to 10% approximately, preferably from 1% to 5% approximately, by weight of the emulsion.

The ratio of the aqueous phase to the oil phase can vary within wide limits. Generally, the water-in-oil emulsions comprise from 20% to 80% approximately of aqueous phase and thus between 80% and 20% approximately of oil phase, these percentages being based on the total weight of the water-in-oil emulsion. A preferred ratio of the aqueous phase to the oil phase is 70 to 75% approximately of the aqueous phase for 30-25% approximately of the oil phase, percentages based on the total weight of the water-in-oil emulsion.

Step 2): polymerization:

As was said above, the polymerization is triggered by means of a chemical initiator comprising free radicals. This initiator can be dissolved either in the oil phase or in the aqueous phase, according to its solubility characteristics. Mention may be made, as examples of water-soluble initiators, of 4,4'-azobis[4-cyanovaleric acid] (abbreviated to ACVA), potassium persulphate ($K_2S_2O_8$) and t-butyl hydroperoxide.

Mention may be made, as examples of oil-soluble initiators, of azobisisobutyronitrile (AIBN) or 2,2'-azobis(2,4-dimethylvaleronitrile) (ADVN). Use may also be made of water-soluble initiators of redox type, such as bromate/bisulphite or metabisulphite (for example, $KBrO_3/NaHSO_3$ or $KBrO_3/NaS_2O_5$) or persulphate/bisulphite initiators. The proportion of chemical initiator used depends on several factors. If, thus, it is necessary to maintain a desired reaction rate, the proportion of initiator has to be increased as the reaction temperature falls. By adjusting the reaction temperature and the proportion of initiator, it is possible to carry out the polymerization in a reasonable time and with a reasonable conversion of monomer to polymer, retaining the advantages of a polymerization at low temperatures.

Other characteristics or advantages may become apparent in the light of the examples which follow, given by way of illustration without a limiting nature.

Preparation of Aqueous Inverse Emulsions by Inverse Polymerization

Example 1

Polymerization in Inverse Emulsion—poly(acrylamide/SPP) 90/10 mol/mol Crosslinked by 0.0025 mol % of N,N'-methylenebisacrylamide (MBA)

The polymer synthesis is composed by 2 steps: emulsion preparation and polymerization.

Emulsion Preparation:

At room temperature in a 2 l glass flask are mixed 26.3 g of Alkamuls S20, 75.1 g of Alkamuls S80, 16.5 g of Rhodibloc RS, 7.1 g of Hypermer B246SF and 797 g of Exxsol D100S. Under magnetic stirring the mixture is kept until limpid solution is obtained (mixture 1). In another 2 l glass flask are mixed 250.9 g of SPP, 1097.2 g of 50% acrylamide, 0.033 g of MBA, 2.44 g of 2,2'-azobis(2-methylpropionamidine)dihydrochloride (Wako V-50) and 2 g of Versene 100. Under magnetic stirring the mixture is also kept until limpid solution is obtained (mixture 2). Afterwards the mixture 2 is added in the mixture 1 under magnetic stirring. The emulsion obtained is then mixed by using a rotor stator (Ultra-turrax) at 1000 rpm over 10 s.

Copolymerization:

The polymerization step is carried out by circulating the mixture obtained in step 1 in a continuous tubular reactor wherein the temperature is being kept at 60° C., with a 2 h residence time.

Final product obtained contains 30 to 35% wt of active polymer and the particle size is about 500 to 600 nm average (determined by light scattering using a Malvern Zeta-sizer device, in case of larger particles, microscopic observations are needed to determine the particle size). Particle size can be adjusted by controlling both the surfactant content and the shear applied during the preparation of the emulsion. Practically speaking, particle size is controllable in a range of 150 nm to 50 μm.

Example 2

Polymerization in Inverse Emulsion—poly(acrylamide/SPP) 90/10 mol/mol Crosslinked by 0.2 mol % of MBA The process of example 1 is repeated except using 2.644 g instead of 0.033 g of MBA.

Example 3

Polymerization in Inverse Emulsion—poly(acrylamide/SPP) 90/10 mol/mol Crosslinked by 0.005 mol % of triacryloylhexahydrotriazine (TAHT)

The process of example 1 is repeated except using 0.105 g of TAHT instead of 0.033 g of MBA.

Example 4

Polymerization in Inverse Emulsion—poly(acrylamide/SPP) 90/10 mol/mol Crosslinked by 2 mol % of p10W.(polyethylene glycol dimethyl acrylate) Commercialized by the Cognis Company The polymer synthesis is composed by 2 steps: emulsion preparation and polymerization.

Emulsion Preparation:

At room temperature in 3 l glass flask are mixed 32.8 g of Alkamuls S20, 93.9 g of Alkamuls S80, 20.6 g of Rhodibloc RS, 8.9 g of Hypermer B246SF and 1007 g of Exxsol D100S. Under magnetic stirring the mixture is kept until limpid solution is obtained (mixture 1). In 2 l glass flask are mixed 250.8 g of SPP, 1097.3 g of 50% acrylamide, 401.4 g of p10W, 2.44 g of 2,2'-azobis(2-methylpropionamidine)dihydrochloride (Wako V-50) and 1 g of Versene 100. Under magnetic stirring the mixture is also kept until limpid solution is obtained (mixture 2). Afterwards the mixture 2 is added in the mixture 1 under magnetic stirring. The emulsion obtained is then mixed by using a rotor stator (Ultra-turrax) at 1000 rpm over 20 s.

Copolymerization:

The polymerization step is carried out by circulating the mixture obtained in step 1 in a continuous tubular reactor wherein the temperature is being kept at 60° C., with a 2 h residence time.

Example 5

Polymerization in Inverse Emulsion—poly(acrylamide/SPP) 90/10 mol/mol Crosslinked by 0.0025 mol % of MBA and 0.005 mol % of PEG400DMA LI The process of example 1 is repeated except adding 0.230 g of PEG400DMA LI. (polyethylene glycol dimethyl acrylate) commercialized by the Cognis company during the preparation of mixture 2.

Comparative Example 6

Polymerization in Inverse Emulsion—poly(acrylamide/SPP) 90/10 mol/mol

The process of example 1 is repeated except using no crosslinker, MBA.

Example 7

Polymerization in Inverse Emulsion—poly(acrylamide/SPP) 90/10 mol/mol Crosslinked by 0.05 mol % of MBA The process of example 1 is repeated except using 0.66 g instead of 0.033 g of MBA.

Example 8

Polymerization in Inverse Emulsion—poly(acrylamide/SPP/N-(hydroxymethyl)acrylamide) 89/10/1 mol/mol/mol Crosslinked by 0.0025 mol % of MBA The polymer synthesis is composed by 2 steps: emulsion preparation and polymerization.

Emulsion Preparation:

At room temperature in 2 l glass flask are mixed 17.33 g of Alkamuls S20, 49.54 g of Alkamuls S80, 10.85 g of Rhodibloc RS, 4.71 g of Hypermer B246SF and 525.6 g of Exxsol D100S. Under magnetic stirring the mixture is kept until limpid solution is obtained (mixture 1). In another 2 l glass flask are mixed 167.3 g of SPP, 723.9 g of acrylamide at 50%, 12.05 g of N-(hydroxymethyl)acrylamide at 48%, 0.022 g of MBA, 1.63 g of 2,2'-azobis(2-methylpropionamidine)dihydrochloride (Wako V-50) and 1.6 g of Versene 100. Under magnetic stirring the mixture is also kept until limpid solution is obtained (mixture 2). Afterwards the mixture 2 is added in the mixture 1 under magnetic stirring. The emulsion obtained is then mixed by using a rotor stator (Ultra-turrax) at 1000 rpm over 10 s.

Copolymerization:

The polymerization step of the above mixture is carried out in a continuous tubular reactor by keeping the temperature of the mixture at 60° C. with a 2 h residence time.

Example 9

Polymerization in Inverse Emulsion—poly(acrylamide/SPP/N-(hydroxymethyl)acrylamide) 80/10/10 mol/mol/mol Crosslinked by 0.0025 mol % of MBA The process of example 11 is repeated except using 165.3 g instead of 167.3 g of SPP, 643 g instead of 723.9 g of acrylamide at 50%, 119.1 g instead of 12.05 g of N-(hydroxymethyl)acrylamide at 48% and 1.4 g instead of 1.6 g of Versene 100.

Preparation and Testing of Compounds Elastomers/Aqueous Inverse Emulsions

Swelling Tests

Swelling properties (above 100%) are tested by immersing samples of the elastomer in various fluids. Initial sample dimensions are approximately 3×1×0.35 cm. Swelling tests are run at 60° C. Samples are weighted before immersion (mi) and then ponctually removed from solution, cleaned from excess fluid and weighted (m). The swelling is reported as a percentage using the following formula: % swelling=(m/mi−1)×100

Aqueous swelling tests are run in either deionised water or salt solutions containing respectively 4% wt NaCl, 4% wt CaCl2 or 20% wt NaCl.

Swelling in oil is run using either a non-aromatic oil EDC 95-11 from Total Fluides or a heavy hydrotreated naphtenic distillates IRM-903 from Calumet Lubricants Co.

Example 10

Silicone Rubber

Inverse emulsion polymer from example 1 is directly blended with commercially available Rhodorsil CAF4 resin (from Blue Star silicones). Resin and inverse emulsion are gently mixed for 5 mn to obtain a fluid homogeneous mixture. Respective quantities of silicone resin and inverse emulsion from example #1 are reported in the table 1 below

TABLE 1

| sample # | polymer content in dry elastomer (% wt) | m silicone resin (g) | m inverse emulsion (g) |
|---|---|---|---|
| 6-1 | 0 | 100 | 0 |
| 6-2 | 15 | 67 | 33 |
| 6-3 | 18 | 60 | 40 |
| 6-4 | 25 | 50 | 50 |

The mixture is then moulded in 3.5 mm thick sheets and let set at room temperature for 4 days. Then unmoulded samples are aged for 3 days at 60° C. in an oven prior performing swelling tests in salted water and in oil and whose results are gathered in tables 2 and 3 below.

TABLE 2

Swelling in 20% NaCl solutions

| polymer content in dry elastomer (% wt) | 7 days (% wt) | 14 days (% wt) |
|---|---|---|
| 0 | 0 | 0 |
| 15 | 80 | 93 |
| 18 | 138 | 155 |
| 25 | 230 | 258 |

Table 2 shows that the swelling increases with the polymer content

TABLE 3

Swelling in oil EDC 95-11

| polymer content in dry elastomer (% wt) | 7 days (% wt) | 14 days (% wt) |
|---|---|---|
| 0 | 86 | 60 |
| 15 | 81 | 82 |
| 18 | 80 | 85 |
| 25 | 61 | 81 |

Table 3 shows that the swelling is more less independent from the polymer content.

Example 11

Polyurethane Rubber

The Polyurethane rubber used is based on an isocyanate functionalized polybutadiene (Krasol NN-3A) and a polybutadiene chain extender (poly BD R45HT) both from Sartomer. Resins and inverse emulsion are gently mixed for 5 mn to get a fluid homogeneous mixture. Respective quantities of resins and inverse emulsion are reported in table 4 below:

TABLE 4

|  | m (g) | % |
|---|---|---|
| krasol NN-3A | 10 | 23.15 |
| poly BD R45 | 7.5 | 17.36 |
| inverse emulsion | 25.7 | 19.63 |

These elastomers are cured at ambient temperature 2 days then aged 7 days at 60° C. then compounded with the polymerized emulsion from example #1 before performing swelling tests.

The results obtained are gathered in the following table 5 wherein the swelling values are mentioned in % by weight:

TABLE 5

|  | Swelling Time | | |
|---|---|---|---|
|  | 1 day | 7 days | 14 days |
| naphtenic oil (IRM 903) | 54 | 110 | 118 |
| deionised water | 80 | 236 | 264 |
| 4% CaCl2 | 137 | 236 | 294 |
| 4% NaCl | 140 | 242 | 290 |
| 20% NaCl | 147 | 260 | 294 |

Degree of Crosslinking

Swelling tests with composite polyurethane rubber elastomers are performed in 20% NaCl solutions. If the hydrophilic polymer crosslinking degree is too low or not crosslinked, leak offs can be evidenced by following the long term swelling as illustrated in table 6 below:

TABLE 6

|  | Swelling Time | | | |
|---|---|---|---|---|
|  | 7 days | 14 days | 28 days | 56 days |
| Example #6 (no MBA) | 240 | 230 | 170 | 86 |
| Example #1 (0.0025% MBA) | 270 | 310 | 350 | 190 |
| Example #7 (0.05% MBA) | 260 | 300 | 330 | 320 |

Example 12

Polyurethane Rubber with OH Functional Polymer

The Polyurethane rubber preparation and testing procedure are identical as in example 11

Compounding with the emulsion polymerization of Example #1; 8 and 9

Swelling tests with composite polyurethane rubber elastomers are performed in 20% NaCl solutions and the results are gathered in table 7 below.

TABLE 7

|  | Swelling Time | | | | |
|---|---|---|---|---|---|
|  | 7 days | 14 days | 28 days | 56 days | 84 days |
| Example #1 (0.0025% MBA) | 270 | 310 | 350 | 190 | 162 |
| Example #8 (1% AmOH) | 180 | 230 | 284 | 331 | 330 |
| Example #9 (10% AmOH) | 190 | 220 | 247 | 276 | 293 |

AmOH is N-(hydroxymethyl) acrylamide)

Table 7 shows that the incorporation of OH functions on the hydrophilic polymer strongly enhances the stability of the swollen elastomer.

Example 13

Measure of the Swelling Property

Three materials incorporating the elastomers of Examples 11 and 12, and having additional functions on the hydrophilic polymer, that may enhance the stability of the swollen elastomer were studied. The inverse emulsion used respectively correspond to Examples 1, 8 and 9. The swelling property of these materials was measured as in the previous Examples. The test consisted in immersing parallelepipedic pieces of product of initial dimensions approximately equal to 5×1×0.5 cm in either brine or oil for prolonged times in days. Periodically, the parallelepipedic pieces were removed from the liquid, cleaned from excess fluid and then weighted (w). The weight was then compared to the initial weight before immersion to give the swelling property ($w_i$). The parallelepipedic pieces were then immersed again in the liquids for another period of time. The swelling property was expressed in wt % as follows:

$$(w/w_i-1)*100.$$

Typical swelling property (with 0, 1 and 10% OH) was evaluated in saline water ([NaCl]=20 wt %) at ambient temperature and aromatic oil IRM 903 at 60° C. as shown in Table 8 and Table 9 below. Materials from examples 11 and 12 are swellable to both saline water and aromatic oil.

TABLE 8

| swelling in 20 wt % NaCl at ambient temperature. 20 wt % NaCl (amb T)/ | | | | | |
|---|---|---|---|---|---|
|  | Immersion time (days) | | | | |
|  | 1 | 4 | 10 | 22 | 31 |
| Example #1 (0.0025% MBA) | 97 | 174 | 201 | 210 | 211 |
| Example #8 (1% AmOH) | 26 | 55 | 90 | 128 | 139 |
| Example #9 (10% AmOH) | 7 | 14 | 20 | 28 | 31 |

AmOH is N-(hydroxymethyl) acrylamide)

TABLE 9 swelling in IRM 903 at 60° C.
IRM 903 (60° C.)

| | Immersion time (days) | | | | |
|---|---|---|---|---|---|
| | 1 | 4 | 10 | 22 | 31 |
| Example #1 (0.0025% MBA) | 43 | 85 | 123 | 143 | 148 |
| Example #8 (1% AmOH) | 27 | 58 | 82 | 98 | 103 |
| Example #9 (10% AmOH) | 38 | 82 | 103 | 118 | 121 |

AmOH is N-(hydroxymethyl) acrylamide)

The invention claimed is:

1. A system for improving zonal isolation in a well in a subterranean formation, comprising:
 a tubular having an outer surface; and
 a swellable coating that coats the outer surface of said tubular, said swellable coating having an external surface wherein the swellable coating is made of a first swellable material which includes an elastomer compounded with an aqueous inverse emulsion of particles of a polymer comprising a betaine group, said compounded elastomer being swellable when contacted by a first fluid, the first fluid comprising hydrocarbon fluids, water or brines;
 wherein the polymer comprising the betaine group comprises one or more of the following monomers: sulphopropyldimethylammonioethyl methacrylate (SPE), sulphoethyldimethylammonioethyl methacrylate, sulphobutyldimethylammonioethyl methacrylate, sulphohydroxypropyldimethylammonioethyl methacrylate (SHPE), sulphopropyldimethylammoniopropylacrylamide, sulphopropyldimethylammoniopropylmethacrylamide (SPP), sulphohydroxypropyldimethylammoniopropylmethacrylamide (SHPP), sulphopropyldimethylammoinioethyl acrylate (SPDA), sulphopropyldiethylammonioethyl methacrylate, 2-vinyl-1-(3-sulphopropyl)pyridinium betaine, 4-vinyl-1-(3-sulphopropyl)pyridinium betaine, 1-vinyl-3-(3-sulphopropyl)imidazolium betaine, or sulphopropylmethyldiallylammonium betaine;
 wherein 1 to 49% by weight of the aqueous inverse emulsion is compounded with 99 to 51% by weight of elastomer, said inverse emulsion comprising between 10 and 40% by weight of water.

2. The system of claim 1, wherein the swellable coating is flexible.

3. The system of claim 1, wherein said system is at least partially surrounded, in the well, by a settable composition.

4. The system of claim 3 wherein the settable composition comprises a material able to swell when in contact with hydrocarbon fluids, water or brines or mixtures thereof.

5. The system according to claim 4 wherein the settable composition includes an elastomer compounded with an aqueous inverse emulsion of particles of a polymer comprising a betaine group.

6. The system of claim 3, wherein the settable composition is cement, microcement, geopolymer, mixture of cement and geopolymer, plaster, resin, phosphomagnesium cement of Chemically Bonded Phosphate Ceramics (CBPCs).

7. The system of claim 3, further comprising one or more alternative protective coatings coating the external surface of the swellable coating to prevent or delay contact between the first swellable material and the first fluid, the composition or both.

8. The system of claim 1, wherein the compounded elastomer is a silicone, a polyurethane rubber, an EPDM rubber or a nitrile rubber.

9. The system of claim 1, wherein the polymer particles have a particle size between 10 nm and 1,000,000 nm.

10. The system of claim 1, further comprising polyvalent polymerizable monomers $C_a$, present at a concentration between 0.001 and 0.1 mol %.

11. A method of improving zonal isolation in a well in a subterranean formation, comprising the steps of:
 lowering, in the well, a tubular having an outer surface;
 coating the outer surface of said tubular with a swellable coating having an external surface;
 the swellable coating being made of a first swellable material able to swell in contact with a first fluid on said external surface;
 said first swellable material including an elastomer compounded with an aqueous inverse emulsion of particles of a polymer comprising a betaine group, said compounded elastomer being able to swell in contact with hydrocarbon, water or brines and mixtures thereof; and
 allowing the swellable coating to swell in contact with an hydrocarbon fluid, water or brines and mixtures thereof;
 wherein the polymer comprising the betaine group is prepared by inverse emulsion polymerization of:
 (i) monomers $A_b$ comprising the betaine group, or
 (ii) the monomers $A_b$ comprising the betaine group, other monovalent monomers $B_a$ and polyvalent polymerizable monomers $C_a$, wherein the monomers $A_b$ and $B_a$ are present at a molar ratio between 4/96 and 40/60,
 wherein the monomers are comprised in an aqueous phase dispersed in the form of droplets in a hydrophobic external phase having hydrophobic surfactants.

12. The method of claim 11, further comprising one or more alternative protective coatings coating the external surface of the first swellable coating to prevent or delay contact between the first swellable material and the first fluid, the composition or both.

13. The method of claim 11, wherein the compounded elastomeric material is a silicone, a polyurethane rubber, an EPDM rubber or a nitrile rubber.

14. The method of claim 11, wherein the polymer comprising the betaine group comprises one or more of the following monomers:
 sulphopropyldimethylammonioethyl methacrylate (SPE), sulphoethyldimethylammonioethyl methacrylate, sulphobutyldimethylammonioethyl methacrylate, sulphohydroxypropyldimethylammonioethyl methacrylate (SHPE), sulphopropyldimethylammoniopropylacrylamide, sulphopropyldimethylammoniopropylmethacrylamide (SPP), sulphohydroxypropyldimethylammoniopropylmethacrylamide (SHPP), sulphopropyldimethylammoinioethyl acrylate (SPDA), sulphopropyldiethylammonioethyl methacrylate, 2-vinyl-1-(3-sulphopropyl)pyridinium betaine, 4-vinyl-1-(3-sulphopropyl)pyridinium betaine, 1-vinyl-3-(3-sulphopropyl)imidazolium betaine, or sulphopropylmethyldiallylammonium betaine.

15. The method of claim 11, wherein the polymer particles have a particle size between 10 nm and 1,000,000 nm.

16. The method of claim 11, wherein 1 to 49% by weight of the aqueous inverse emulsion is compounded with 99 to 51% by weight of elastomer, sand inverse emulsion comprising between 10 and 40% by weight of water.

17. The method of claim 11, further comprising:
provided a settable composition in the annular space outside the tubular, said composition comprising a second swellable material, the first swellable material or both; and
allowing the composition to swell in contact with a hydrocarbon fluid, water or brine or mixtures thereof.

18. The method of claim 17, wherein the settable composition is cement, microcement, geopolymer, mixture of cement and geopolymer, plaster, resin, phosphomagnesium cement or Chemically Bonded Phosphate Ceramics (CB-PCs).

* * * * *